United States Patent [19]
Kolb

[11] Patent Number: 5,344,266
[45] Date of Patent: Sep. 6, 1994

[54] FULLY ADJUSTABLE STORAGE DEVICE FOR LOADING AND TRANSPORTING VEHICLES IN CONTAINERS

[76] Inventor: Peter W. Kolb, 2040 NW. 96th Ave., Miami, Fla. 33172

[21] Appl. No.: 48,471

[22] Filed: Apr. 16, 1993

[51] Int. Cl.⁵ .............................................. B60P 3/08
[52] U.S. Cl. ......................................... 410/26; 410/46; 410/145
[58] Field of Search ................. 414/498; 410/4, 15, 410/24, 25, 26, 27, 28, 29.1, 30, 130, 140, 144, 145, 414, 410

[56] References Cited

U.S. PATENT DOCUMENTS

| | | |
|---|---|---|
| 1,229,714 | 6/1917 | Clark et al. . |
| 1,247,533 | 11/1917 | Linquist et al. . |
| 1,421,747 | 7/1922 | Thompson ............................ 410/25 |
| 1,436,766 | 11/1922 | Kendrick ............................ 188/32 |
| 1,693,184 | 11/1928 | Rumley . |
| 2,009,149 | 7/1935 | Pierce . |
| 2,165,376 | 7/1939 | Helmer . |
| 2,386,836 | 10/1945 | Blagden . |
| 2,611,640 | 9/1952 | Francis . |
| 2,617,368 | 11/1952 | McCormick ......................... 410/26 |
| 2,684,264 | 7/1954 | Demos ................................. 410/24 |
| 3,498,480 | 3/1970 | Gutridge . |
| 3,675,795 | 7/1972 | Dluhy . |
| 3,797,410 | 3/1974 | Blunden . |
| 3,841,235 | 10/1974 | Wheeler et al. . |
| 3,880,457 | 4/1975 | Jones, Jr. . |
| 3,994,523 | 11/1976 | Harold . |
| 4,044,691 | 8/1977 | Kilgus et al. . |
| 4,124,119 | 11/1978 | Nordstrom . |
| 4,316,686 | 2/1982 | Cottrell et al. . |
| 4,343,401 | 8/1982 | Paulyson . |
| 4,637,763 | 1/1987 | Van Iperen ........................... 410/4 |
| 4,668,141 | 5/1987 | Petersen . |
| 4,688,142 | 5/1987 | Fity et al. . |
| 4,759,668 | 7/1988 | Larsen et al. ......................... 410/24 |
| 4,768,916 | 9/1988 | Gearin et al. . |
| 4,797,049 | 1/1989 | Gearin et al. . |
| 4,801,229 | 1/1989 | Hanada et al. . |
| 4,881,859 | 11/1989 | Ehrlich . |
| 4,911,590 | 3/1990 | Green . |
| 4,917,557 | 4/1990 | Kato et al. . |
| 4,919,582 | 4/1990 | Bates et al. ......................... 414/498 |
| 4,963,067 | 10/1990 | Gearin et al. . |
| 4,966,510 | 10/1990 | Johnson, Jr. . |
| 4,992,013 | 2/1991 | Westerdale . |
| 5,044,866 | 9/1991 | Harp ................................... 410/26 |
| 5,106,246 | 4/1992 | Chance . |
| 5,110,242 | 5/1992 | Chance . |
| 5,213,458 | 5/1993 | Preller et al. . |
| 5,253,975 | 10/1993 | Takaguchi ........................... 410/26 |

FOREIGN PATENT DOCUMENTS

418178  3/1991  European Pat. Off. .......... 410/24.1

Primary Examiner—Michael S. Huppert
Assistant Examiner—Gregory A. Morse
Attorney, Agent, or Firm—Leslie J. Lott & Assoc.

[57] ABSTRACT

An adjustable storage device for loading and transporting vehicles in containers, including a deck for supporting a vehicle in an elevated position, at least two pairs of substantially vertical legs with a plurality of leg pegs positioned along the length of each of the legs; at least two substantially horizontal crossbars, a crosspiece of the crossbars bridging the pairs of legs; a hooking ring member encircling each of the legs and removably engaging one of the leg pegs and an arm peg on each of the arms of the crossbar; and at least two floor bars and a wall brace for securing the storage device to the wall of the container.

6 Claims, 5 Drawing Sheets

FULLY ADJUSTABLE STORAGE DEVICE FOR LOADING AND TRANSPORTING VEHICLES IN CONTAINERS

TECHNICAL FIELD

This invention relates generally to vehicle loading devices and this invention specifically relates to an adjustable storage device for loading and transporting vehicles in containers.

BACKGROUND OF THE INVENTION

In the maritime shipping industry, large containers are utilized to store and transport goods across water. Such containers are, in certain applications, refrigerated to allow for the shipment of perishable goods such as produce. In past years, as a result of various international trade situations, these containers, both refrigerated and unrefrigerated, were often loaded with goods being shipped to the United States and then returned empty to their ports of origin. Rather than continue the practice of returning the containers to their ports of origin empty, the industry recently began using the containers to store and transport automotive vehicles from the United States to nations lacking an adequate supply of such vehicles.

Because of the somewhat delicate nature of vehicle bodies, and also to protect the interior of the maritime containers, it is necessary to carefully load and secure vehicles within the container. Care must be taken to ensure that the vehicles do not contact one another and also that the vehicles do not contact those portions of the interior of the container that could be damaged by the vehicles. The same care is required when the containers are unloaded from ships and placed on trucks or trains and transported to their ultimate destination.

Previous attempts have been made to provide systems for loading and securing vehicles inside containers. The most recent of such attempts are illustrated in U.S. Pat. No. 5,106,246 (the '246 patent), and U.S. Pat. No. 5,110,242 (the '242 patent), both to Chance and both incorporated herein by reference.

The '246 patent, which is a continuation-in-part of the application which issued as the '242 patent, describes an apparatus for loading freight and automobiles inside maritime containers. The apparatus of the '246 patent includes a platform assembly for supporting one or two automobiles. When the platform assembly is parallel to the bottom surface of the container, the apparatus allows for up to four automobiles to be stored and transported within the container. When the platform assembly is arranged in an angled configuration, as shown in FIG. 12 of the '246 patent, only one automobile can be stored and transported in the area below the platform assembly. FIG. 13 of the '246 patent illustrates the use of a forklift to assemble the apparatus within a maritime container. The angle of the platform assembly is adjusted by engaging a forklift in pockets of the platform assembly and raising or lowering the platform assembly, by use of the forklift, to a desired position.

The '242 patent describes an apparatus for storing four vehicles in a maritime container. The apparatus includes four locking mechanisms for suspending a platform at a pre-determined distance from the floor of the container. The angle of the platform is adjusted by temporarily replacing at least one of the four locking mechanisms with a removable jack assembly. The jack assembly includes a mechanical crank which adjusts the angle of the platform.

The devices disclosed in the above references include numerous disadvantages. First, when the platform of the above devices is in an angled configuration, only one vehicle can be stored below it. Thus, whenever a large vehicle is to be shipped in a container, the total number of vehicles to be transported in the container is necessarily limited. Second, in order to load vehicles into the container, the platform of the above-discussed devices must be manipulated, as discussed, for example, at column 3, lines 10-42 of the '242 patent. The requirement of additional labor in order to load vehicles is both time-consuming and costly. Third, the devices must be removed from the containers when vehicles are not being transported, as the volume occupied by the hardware is too large to justify dedicating the device to the container. As a result of the bulkiness of these devices, additional time and labor costs are incurred in taking the devices out of containers and then putting the devices back into containers.

Fourth, the devices require additional hardware, such as a forklift or a removable jack assembly, in order to adjust the angle of the platform. This additional hardware is costly and results in more time being devoted to the loading and unloading of vehicles. Additionally, the angle is not fully adjustable, as the ramps can only be positioned in a limited number of angled configurations. Fifth, the devices have no uses outside a container, such as for storing vehicles in a warehouse. Sixth, securing the devices to the containers requires the use of hardware, such as is shown in FIG. 1A of the '242 patent. In refrigerated containers, hardware cannot be employed in certain areas, as the refrigeration elements are subject to damage if hardware is utilized.

An additional attempt to provide a device for loading and transporting vehicles in maritime containers includes an adjustable ramp supported by two generally upside down U-shaped support bars. If the ramp is to be positioned in an angled configuration, a tall support bar and a short support bar are utilized. If the ramp is to be positioned substantially parallel to the floor of the container, two support bars of equal height are utilized. In either situation, the ramp is secured to the two support bars. However, the angle of the ramp cannot be adjusted other than by sliding the short support bar along the floor of the container, and such sliding can only change the angle of the ramp slightly.

One possible solution to these problems is to provide an adjustable storage device for loading and transporting vehicles in maritime containers, wherein the device may be angled in numerous configurations without limiting the number of vehicles capable of being stored thereon. Incorporated into such a device is the ability to efficiently and expeditiously load vehicles by manually adjusting the angle of the device, without the need for additional hardware. Further, such a device may be disassembled and dedicated to a container without taking up storage space otherwise needed to transport goods. Finally, the device may be securely mounted to a container without the need for placing hardware in locations which may damage the cooling elements of a refrigerated container.

Thus, there is a need in the art for a fully adjustable storage device for loading and transporting vehicles in maritime containers, wherein the device may be angled in numerous configurations without limiting the number of vehicles capable of being stored thereon.

There is an additional need in the art for a fully adjustable storage device which includes the ability to efficiently and expeditiously load vehicles by manually adjusting the angle of the device, without the need for additional hardware.

There is an additional need in the art for a fully adjustable storage device which may be disassembled and dedicated to a container without taking up storage space otherwise needed to transport goods.

There is an additional need in the art for a fully adjustable storage device which may be securely mounted to a container without the need for placing hardware in locations which may damage the cooling elements of a refrigerated container.

SUMMARY OF THE INVENTION

The present invention overcomes these and other difficulties encountered in previous approaches to providing an adjustable storage device for loading and transporting vehicles in a substantially rectangular container having a roof, a floor, and four walls. Briefly described, the fully adjustable storage device of the present invention comprises a deck for supporting a vehicle in an elevated position; means for adjustably elevating said deck; and means for stabilizing said storage device within said container.

More particularly described, the preferred embodiment of the storage device of the present invention comprises a deck for supporting a vehicle in an elevated position, the deck comprising a substantially rectangular planar surface capable of securely supporting a vehicle at various angled elevations relative to the floor of the container, the deck having a front end and a rear end; means for adjustably elevating the deck, comprising at least two pairs of substantially vertical legs, one pair positioned substantially adjacent the front end of the deck and one pair positioned substantially adjacent the rear end of the deck; at least two substantially horizontal crossbars, a crosspiece on each of the crossbars bridging the pairs of legs; means for adjustably securing each of the crossbars to each of the pairs of legs, comprising a plurality of leg pegs positioned along the length of each of the legs and extending outwardly from each of the legs; an arm peg positioned on each of a first arm and a second arm perpendicularly abutting the crosspiece of the crossbar and extending outwardly from the arms; and a hooking ring member attached to each of the legs and removably engaging any one of the leg pegs on each of the legs, the hooking ring member also removably engaging the arm peg on the arms of the crossbar; and means for removably fastening the deck to a top surface of each of the crossbars; means for stabilizing the storage device within the container, comprising at least two floor bars removably mounted to the pairs of legs so as to join one leg of each of the pairs of legs together, and further comprising a wall brace for securing the storage device to the walls of the container, the wall brace mounted on the first end and second end of the crossbar and extending horizontally outwardly to firmly engage the walls of the container; and means for adjusting the width of the deck so as to enable vehicles of varying widths to be stored on the deck, the width adjusting means comprising at least one slideable collar element mounted to each of the crossbars.

Accordingly, it is an object of the present invention to provide an adjustable storage device for loading and transporting vehicles in containers.

It is another object of the present invention to provide an adjustable storage device for loading and transporting vehicles in containers which allows for efficient and expeditious loading of vehicles by manually adjusting the angle of the ramp portion of the device, without the need for additional hardware.

It is another object of the present invention to provide an adjustable storage device for loading and transporting vehicles in containers which allows for efficient and expeditious loading of vehicles by mechanically adjusting the angle of the ramp portion of the device.

It is another object of the present invention to provide an adjustable storage device for loading and transporting vehicles in containers which may be disassembled and dedicated to a container without taking up storage space otherwise needed to transport goods.

It is another object of the present invention to provide an adjustable storage device for loading and transporting vehicles in containers which may be securely mounted to a container without the need for placing hardware in locations which may damage the cooling elements of a refrigerated container.

It is another object of the present invention to provide an adjustable storage device for loading and transporting vehicles in containers which may be assembled and loaded outside the container and then wheeled into the container for loading and transporting.

These and other objects, features, and advantages of the present invention may be more clearly understood and appreciated from a review of the following detailed description of the disclosed embodiment and by reference to the appended drawings and claims.

DETAILED DESCRIPTION OF THE PREFERRED EMBODIMENT

Figure 1:
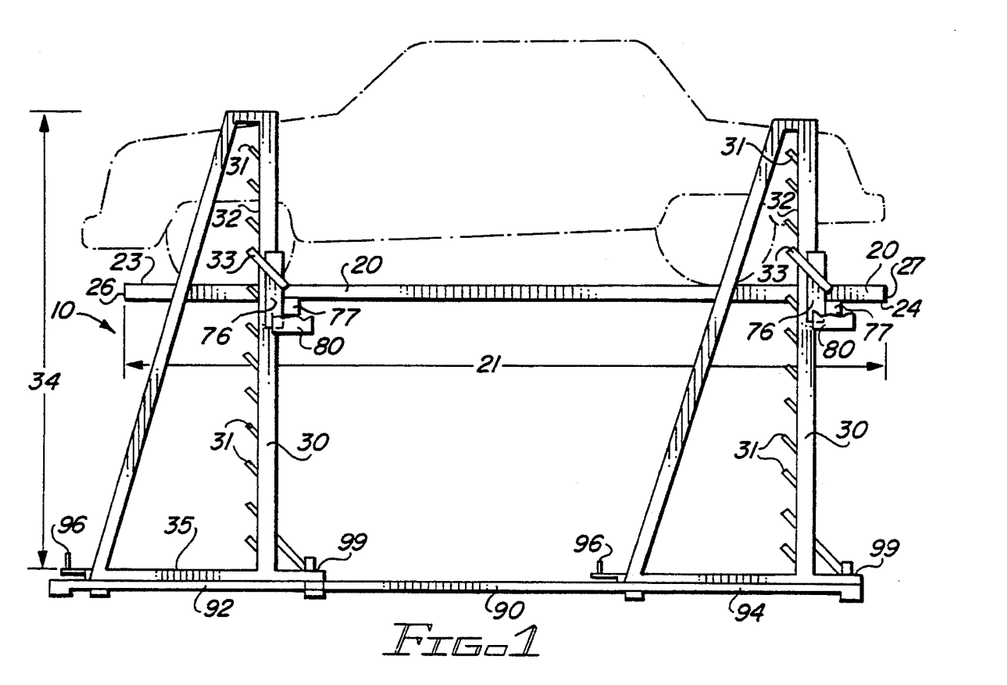
FIG. 1 is a side view of the preferred embodiment of an adjustable storage device for loading and transporting vehicles in containers, with the deck of the storage device positioned in its parallel configuration.
Figure 2:
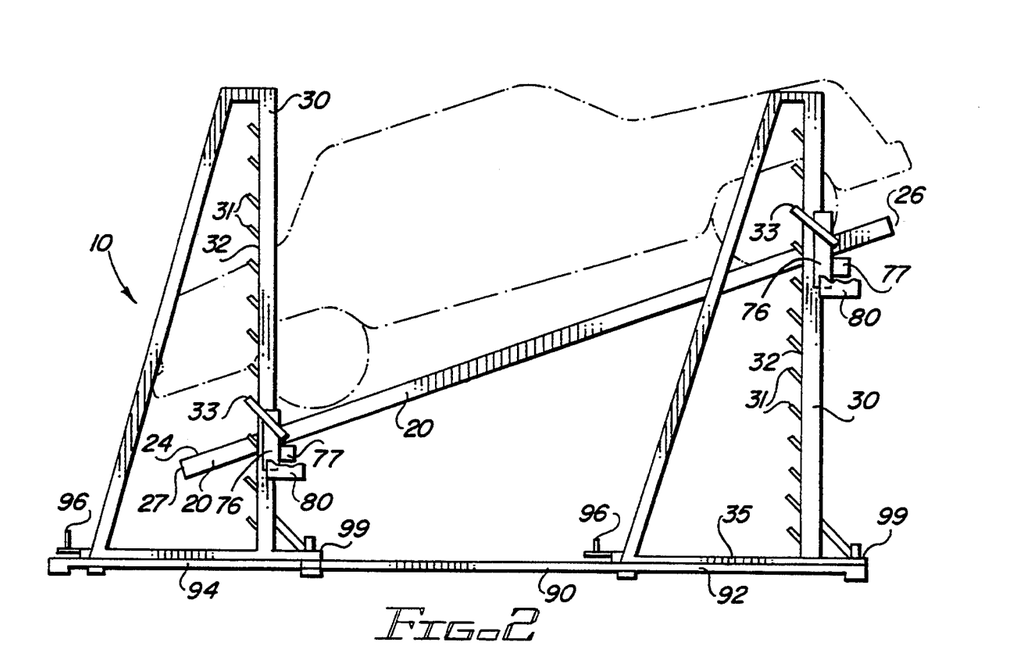
FIG. 2 is a side view of the preferred embodiment of an adjustable storage device for loading and transporting vehicles in containers, with the deck of the storage device positioned in an angled configuration.
Figure 3:
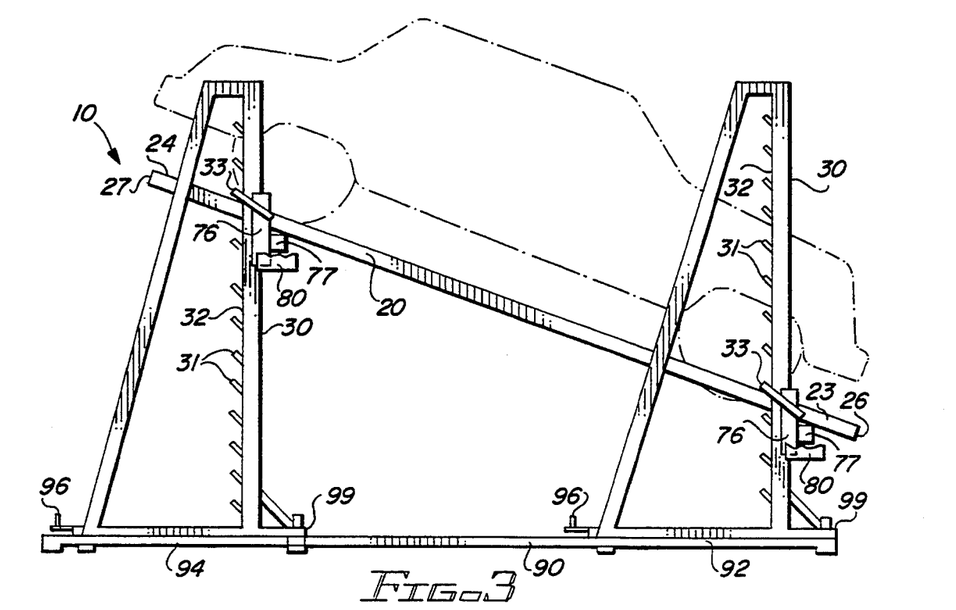
FIG. 3 is a side view of the preferred embodiment of an adjustable storage device for loading and transporting vehicles in containers, with the deck of the storage device positioned in an angled configuration different from the angled configuration shown in FIG. 2.
Figure 9:
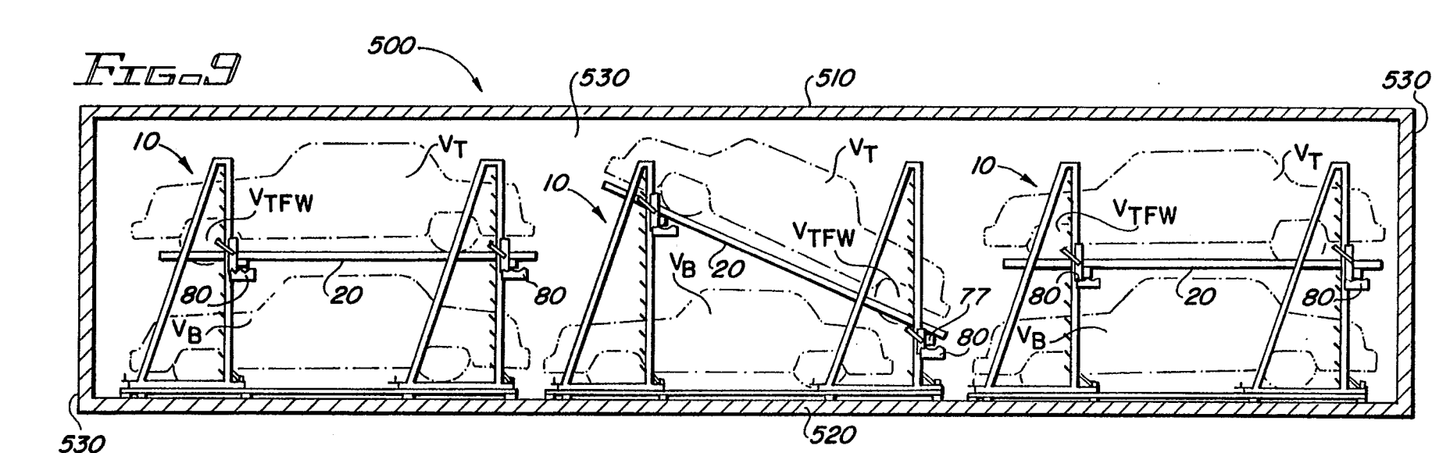
FIG. 9 is a cross-sectional view of a container loaded with a plurality of adjustable storage devices for loading and transporting vehicles in containers.

Turning now to the drawings, in which like numerals represent like components throughout all the views, FIGS. 1-3 are side views of the preferred embodiment of the present invention, a storage device 10 for loading and transporting vehicles in a substantially rectangular container 500 having a roof 510, a floor 520, and four walls 530 (shown in FIG. 9). The storage device 10 of the present invention generally includes a deck 20, four legs 30, two crossbars 70 (shown in FIG. 4), and two floor bars 90. Because so few pieces of hardware comprise the device 10, the device 10 may be quickly and efficiently disassembled and stored in a container 500 without occupying costly space otherwise needed to store and transport inventory.

Figure 4:
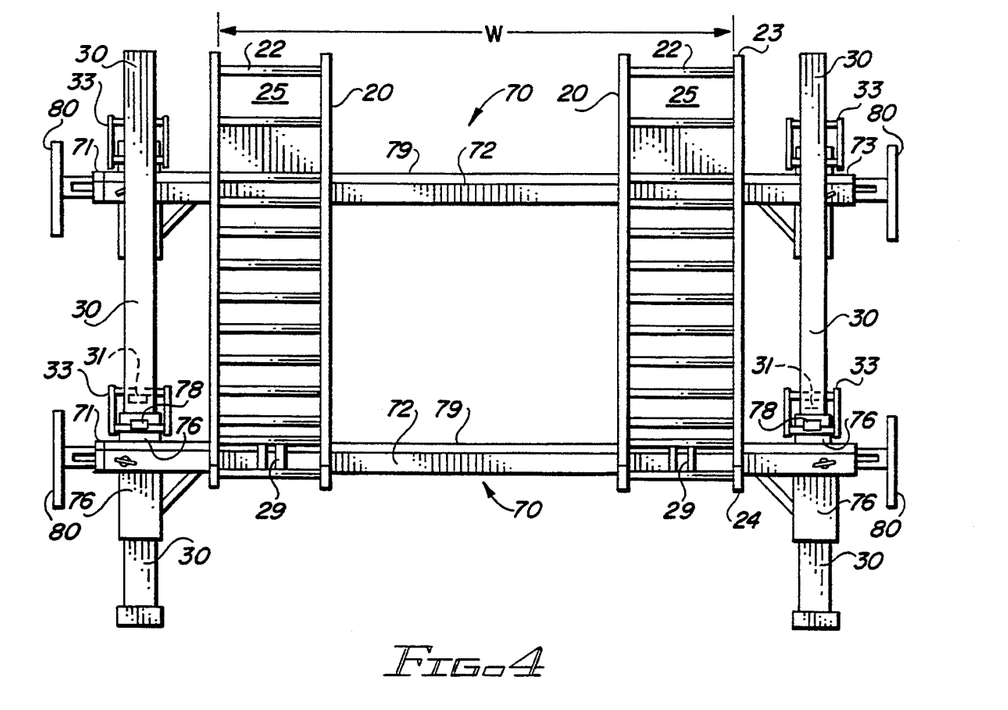
FIG. 4 is a front orthographic view of the preferred embodiment of an adjustable storage device for loading and transporting vehicles in containers, with the deck of the storage device positioned in the angled configuration of FIG. 2.
Figure 7:
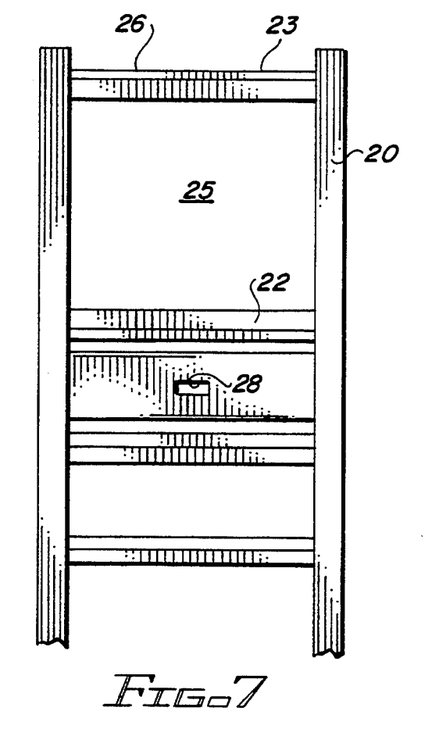
FIG. 7 is a top orthographic view of a wheel well of the deck of the preferred embodiment of an adjustable storage device for loading and transporting vehicles in containers.

Looking at FIG. 4, the deck 20 is generally rectangular in shape and, in its preferred embodiment, includes two parallel rows of rungs 22 upon which the wheels of an automotive vehicle are guided along the length 21 of the deck 20. The rows of rungs 22 are positioned so that the distance between them approximates the width W of the wheel base of the automotive vehicle to be loaded upon the deck 20. The rows of rungs 22 include a front end 23 and a rear end 24. A wheel well 25, also shown in detail in FIG. 7, is positioned towards the front end 23 of each row of rungs 22. When the automotive vehicle is driven onto the rungs 22, the forward tires of the vehicle drop into the wheel well 25 and prevent the vehicle from rolling. The vehicle may be driven onto the deck 20 such that either the front tires or the rear tires of the vehicle drop into the wheel well 25.

It may be understood by those skilled in the relevant art that the deck 20 may alternatively include only one set of rungs which extends at least the entire width of the vehicle to be loaded upon the deck. The width of this alternative set of rungs is at least equal the width of the two sets of rungs 22 shown in the preferred embodiment, plus the distance between the two rows of rungs 22 shown in the preferred embodiment.

Looking again at FIGS. 1-3, the legs 30 are substantially right-triangular in shape and are positioned so that one pair of legs 30 is adjacent the front end 26 of the deck 20 and the other pair of legs 30 is adjacent the rear end 27 of the deck 20. Each pair of legs 30 is bridged by one of the crossbars 70, which includes a crosspiece 77, as shown in FIG. 4. The floor bars 90 are utilized to secure one leg of each pair of legs together, as detailed in FIGS. 10 and 11.

FIGS. 1-3 illustrate the three general configurations in which a vehicle may be loaded on the deck 20 of the storage device 10, namely substantially parallel to the floor of the container 500 (FIG. 1), with the front of the vehicle elevated above the rear of the vehicle (FIG. 2), or with the rear of the vehicle elevated above the front of the vehicle (FIG. 3). These three drawing figures also illustrate the manner in which the wheel wells 25 of the deck 20, shown in detail in FIG. 7, securely maintain the vehicles after they are driven onto the deck 20.

Figure 5:
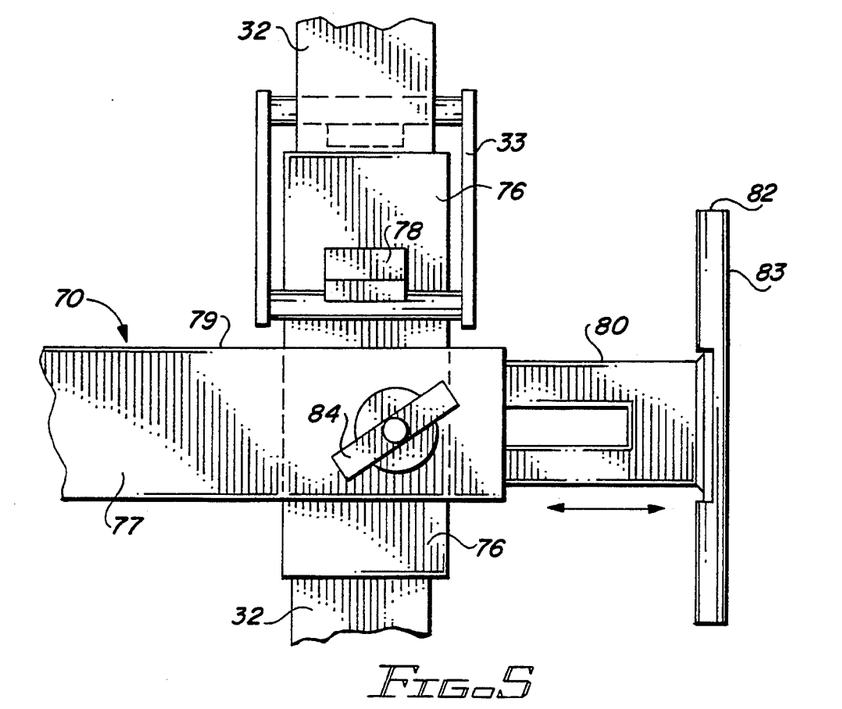
FIG. 5 is a front orthographic view of a wall brace of the preferred embodiment of an adjustable storage device for loading and transporting vehicles in containers.
Figure 6:
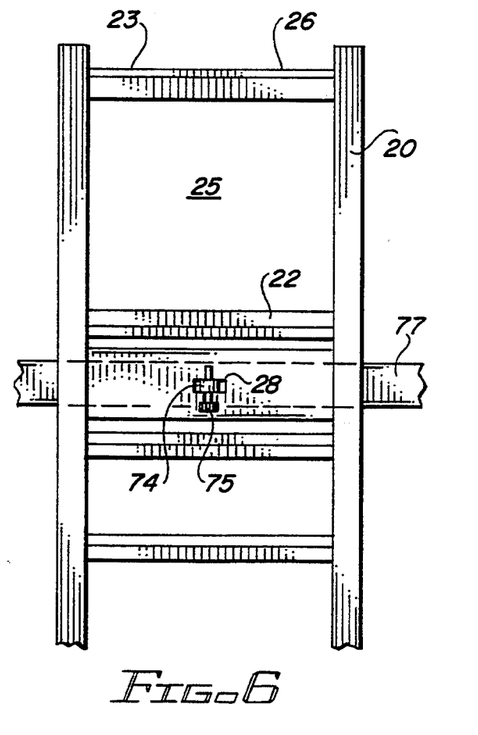
FIG. 6 is a top orthographic view of the structural relationship between a cross bar and deck of the preferred embodiment of an adjustable storage device for loading and transporting vehicles in containers.
Figure 8:
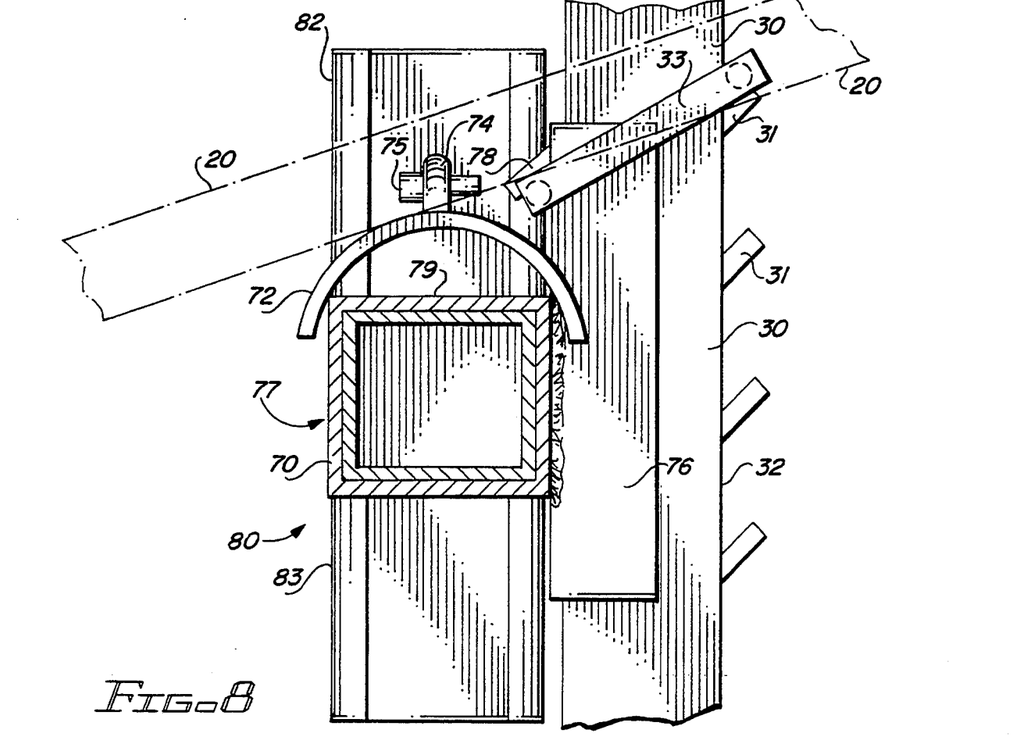
FIG. 8 is a side view of the structural relationship between the legs and cross bars of the preferred embodiment of an adjustable storage device for loading and transporting vehicles in containers, looking towards a wall of a container from a location inside the perimeter formed by the four legs.

The deck 20 is removably mounted to the crossbars 70, as shown in FIG. 6, which in turn are adjustably secured to the legs 30, as detailed in FIGS. 5 and 8. The deck 20 includes slots 28, 29 positioned near the front end 23 and the rear end 24 of each row of rungs 22. The top surface 79 of each of the crosspieces 77 of the crossbars 70 includes a pair of slideable collars 72, detailed in FIG. 8, semi-encircling the crosspieces 77 of the crossbars 70. Extending outwardly from each collar 72 is an eyelet 74 which engages one of the slots 28, 29 of the deck 20. Once a slot 28, 29 is positioned over the eyelet 74, a pin 75 is placed through the eyelet 74 and secures the deck 20 to the crossbars 70. In the event the width W of the wheel base of the vehicle to be loaded onto the deck 20 is such that the distance between the rows of rungs 22 needs to be either increased or decreased, the collars 72 of the crossbars 70 may be slid along the crosspieces 77 until the rungs 22 are appropriately spaced to receive the vehicle.

The crossbars 70 each include a pair of arms 76 mounted substantially perpendicular to the crosspieces 77 of the crossbars 70. Each of the arms 76 includes a single arm peg 78 extending outwardly from a side of said arm 76 in a substantially downward angled direction, also shown in FIG. 5. The legs 30 include a plurality of leg pegs 31 extending outwardly from a side 32 of each leg 30 in a substantially upward angled direction and spanning nearly the entire length 34 of the side 32 of the legs 30. A substantially rectangular hooking ring member 33 encircles the pegged section of each of the legs 30. The dimensions of the hooking ring member 33 are such that the hooking ring member 33 is capable of either sliding over or hooking onto each of the leg pegs 31 along the entire length 34 of the leg 30. In operation, the hooking ring member 33 is moved to the desired peg location, where it is then hooked over the appropriate leg peg 31. The hooking ring member 33 then engages the arm peg 78 on the arm 76 of the crossbar 70, thereby positioning the crossbar 70. This manner of attaching the crossbar 70 to the legs 30 by the use of the hooking ring member 33 allows the crossbars 70, and therefore the deck 20, to be positioned at the height of any of the leg pegs 31 along the legs 30. Furthermore, by positioning one of the crossbars 70 at a particular height and the other of the crossbars 70 at a different height, the deck 20 is placed in an angled configuration. The use of an angled configuration may be necessary where the vehicle to be stored below the deck 20 has, for example, a higher rear end than front end. In such a situation, the deck 20 may be angled so that the portion of the deck 20 over the front end of the vehicle is lower than the portion of the deck 20 over the rear end of the vehicle. The angled configuration is also useful when providing adequate clearance between the vehicle stored on the deck 20 and the roof 510 of the container 500.

The adjustability of the deck is best illustrated in FIG. 8. The elevation and the angle at which the deck 20 is positioned in relation to the roof 510 and the floor 520 of a container 500 are controlled by disengaging each hooking ring member 33 from the particular leg pegs 31 of each leg 30 and re-engaging each hooking ring member 33 on a different leg peg 31. In order that the rows of rungs 22 of the deck 20 correspond with one another, the two hooking ring members 33 utilized with a pair of legs bridged by one crossbar 70 should engage leg pegs 31 at the same height along the length 34 of their corresponding legs 30. In the preferred embodiment, the leg pegs 31 are numbered to facilitate placement of the hooking ring members 33 on corresponding leg pegs 31. By simply moving the hooking ring member 33 from one leg peg 31 to another, either or both of the elevation and angle of the deck 20 in relation to the roof 510 and the floor 520 of a container 500 may be quickly and efficiently modified. As illustrated in FIGS. 1-3 and 9, the angle and elevation of the deck 20 may be altered to accommodate vehicles of various dimensions and configurations, in order that such vehicles may be loaded in a manner that provides sufficient clearance between the vehicles and the roof 510 of the container 500. Movement of the hooking ring members 33 may best and most efficiently be accomplished manually, but this movement may also be accomplished remotely through mechanical, electronic, or hydraulic mechanisms (not shown) by attaching appropriate control means (not shown) to each of the hooking ring members 33.

Figure 10:
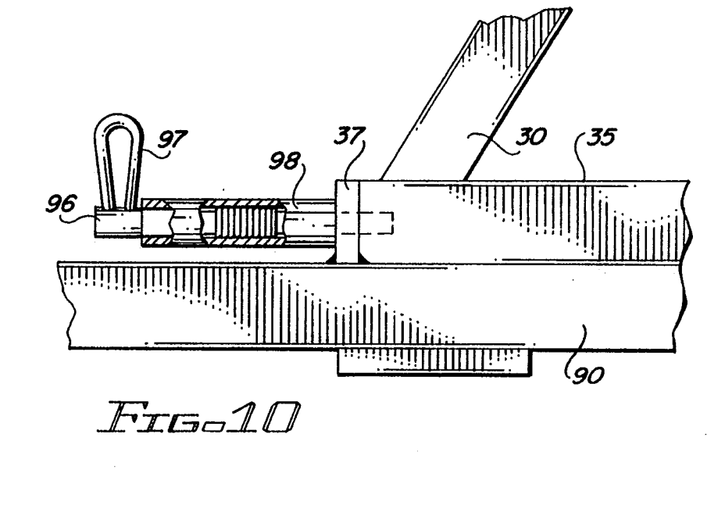
FIG. 10 is a side view of the structural relationship between a leg and support bar of the preferred embodiment of an adjustable storage device for loading and transporting vehicles in containers, illustrating the spring-loaded securing mechanism.
Figure 11:
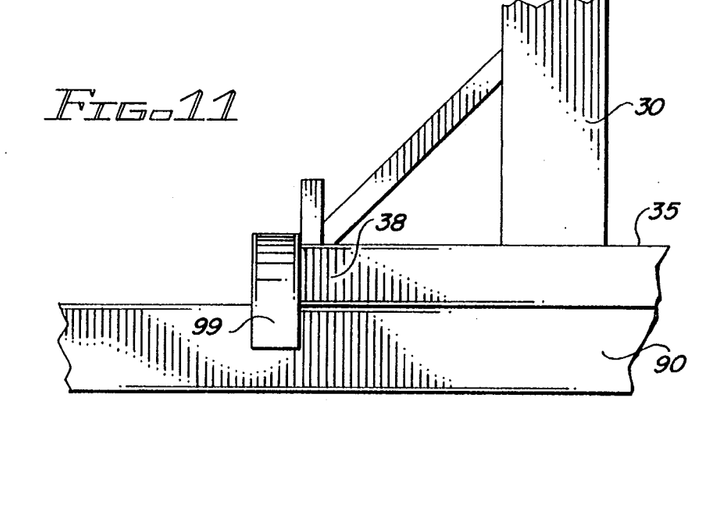
FIG. 11 is a side view of the structural relationship between a leg and support bar of the preferred embodiment of an adjustable storage device for loading and transporting vehicles in containers, illustrating the leg-clamping mechanism.

FIGS. 5 and 10-11 illustrate how the storage device 10 is stabilized within a container 500. Once the deck 20, legs 30, and crossbars 70 are assembled in the manner discussed above, the floor bars 90 and a series of wall braces 80 are utilized to stabilize the storage device 10. The floor bars 90 are removably mounted to the device 10 so as to join one leg of each pair of legs together. The floor bars 90 have a first end 92 and a second end 94. Each end 92, 94 of the floor bars 90 includes two independent means for engaging a leg 30 of the device 10 of the present invention, a spring-loaded mechanism 96 and a leg-clamping mechanism 99 both secured to the floor bar 90. The base 35 of each leg 30 includes a hole 37 for engaging the spring-loaded mechanism 96 and a stabilizing channel 38 for engaging the leg-clamping mechanism 99. In operation, the stabilizing channel 38 is slid into the leg-clamping mechanism 99, a substantially upside down U-shaped element welded to the floor bar 90, shown in FIG. 11. Once the stabilizing channel 38 is engaged by the leg-clamping mechanism 99, the hole 37 is positioned so as to be aligned with the spring-loaded mechanism 96. Once aligned, the lever 97 of the spring-loaded mechanism 96 is flipped one hundred eighty degrees, forcing a bolt 98 into the hole 37, as shown in FIG. 10.

Once the storage device 10 is loaded in a container 500, the storage device 10 is stabilized by securing it to the walls of the container 500. This is accomplished through the use of the wall braces 80, shown in FIG. 5, which allow for securing of the device 10 without exposing the container 500 to damage resulting from inserting nails, screws, bolts, or other potentially damaging hardware into the walls 530 of the container 500, particularly when the container 500 contains refrigeration mechanisms. The wall braces 80 are mounted on a first end 71 and a second end 73 of each of the crossbars 70. The wall braces 80 include a substantially sideways T-shaped element 82 which extends outward from the ends 71, 73 of the crossbars 70. The T-shaped element 82 is preferably covered with a shoe 83 manufactured from plastic or rubber. Once the device 10 is properly positioned within the container 500, the T-shaped element 82 is manually extended outwardly to firmly engage the wall 530 of the container 500. A locking handle 84 on each of the wall braces 80 is then turned to secure the T-shaped element 82 in this position.

Loading of vehicles into containers 500 utilizing the storage device 10 of the present invention occurs as follows. The deck 20, legs 30, the crossbars 70, and the leg bars 90 are assembled as discussed in the preceding discussion. The elevation and angle of the deck 20 are then adjusted to provide sufficient clearance for a bottom vehicle VB to be driven into the container 500. Loading of vehicles into containers is a well-known practice to those familiar to the industry. A ramp is positioned adjacent the floor 520 of the container and the vehicle is driven up the ramp and into the container. Once the bottom vehicle VB is properly positioned abutting the floor 520 of the container 500, the angle of the deck 20 is adjusted to receive a top vehicle VT such that the top vehicle VT may be loaded with sufficient clearance between the top vehicle VT and the roof 510 of the container 500. An approach ramp (not shown) is then mounted to the deck 20 and the top vehicle VT is driven up the approach ramp and the deck 20 until the front wheels VTFW drop into the wheel wells 25 of the deck 20. Once the vehicles are loaded in the container, the vehicles themselves are secured to the storage device 10 in a manner well-known to those skilled in the relevant art.

In a preferred embodiment, up to three (3) storage devices 10 of the present invention may be assembled and loaded in a maritime container 500, as shown in FIG. 9. The multiple devices 10 are independent of one another and the elevations and angles of the decks 20 of each device 10 may be varied to suit the dimensions of the particular vehicles being loaded onto each particular device 10. The above procedure may alternatively be altered such that the bottom vehicle VB may be driven into the container and the device 10 assembled around the bottom vehicle VB.

Figure 12:
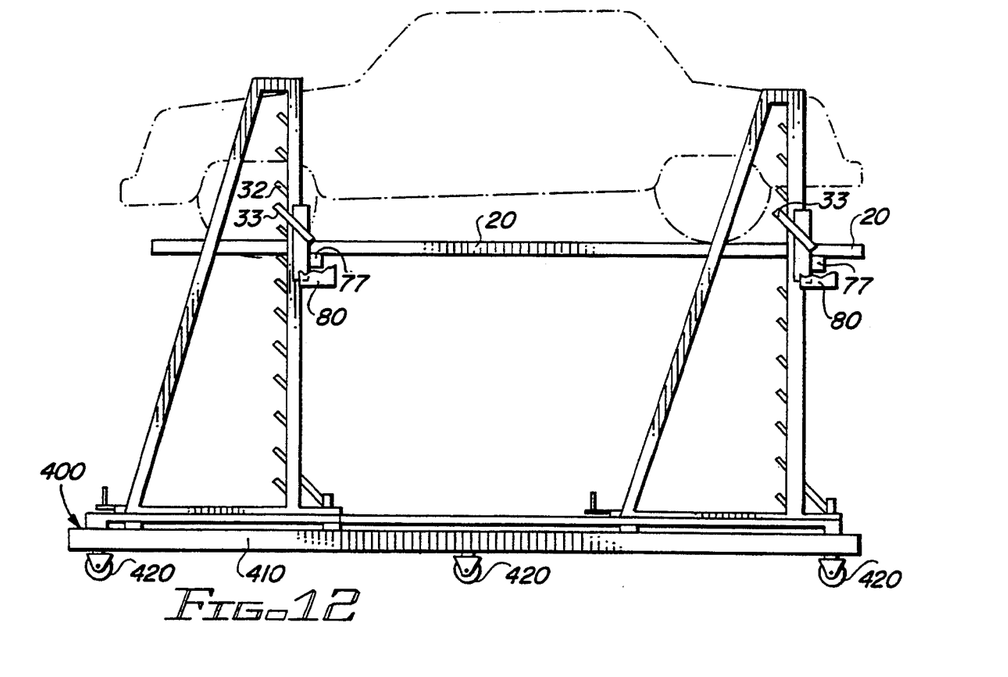
FIG. 12 is a side view of an alternative embodiment of an adjustable storage device for loading and transporting vehicles in containers, with the deck of the storage device positioned in its parallel configuration and with a dolly mechanism mounted thereto.

FIG. 12 illustrates an alternative embodiment of the present invention, which incorporates a dolly mechanism 400 having a platform 410 and a plurality of wheels 420 attached to the platform 410. The device 10 may be assembled directly on top of the platform 410 of the dolly mechanism 400, with a top vehicle VT and a bottom vehicle VB loaded onto the assembled device 10. The dolly mechanism 400 enables its user to assemble the storage devices 10 of the present invention and store them in warehouses while awaiting containers. Storage of the assembled devices 10 virtually doubles the number of vehicles which may be stored in a warehouse, as the loaded devices 10, in their assembled configuration, each accommodate two vehicles, while the space on the warehouse floor occupied by the dolly mechanism 400 would ordinarily accommodate only one vehicle. Furthermore, when the vehicles are to be loaded onto a container, the dolly mechanism 400 may simply be wheeled into the container, providing an efficient and expedient method for loading vehicles into containers. Once inside the container, the wheels 420 are locked to prevent them from rolling and the device 10 and vehicles are secured to the container in the manner discussed above.

Accordingly, it will be understood that both the preferred and alternative embodiments of the present invention have been disclosed by way of example and that other modifications and alterations may occur to those skilled in the art without departing from the scope and spirit of the appended claims.

What is claimed is:

1. An adjustable storage device for loading and transporting vehicles in a substantially rectangular container having a roof, a floor, and four walls, comprising:
    (a) a deck for supporting a vehicle in an elevated position comprising a substantially rectangular planar support capable of securely supporting a vehicle at various angled elevations relative to said floor of said container, said deck having a front end and a rear end;
    (b) means for adjustably securing said deck in an elevated position comprising
        (i) at least two pairs of substantially vertical legs, one pair positioned substantially adjacent said front end of said deck and one pair positioned substantially adjacent said rear end of said deck;
        (ii) at least two substantially horizontal crossbars, a crosspiece of said crossbars bridging said pairs of legs;
        (iii) means for adjustably securing each of said crossbars to each of said pairs of legs in said bridging relationship comprising
            (A) a plurality of leg pegs positioned along the length of each of said legs and extending outwardly from each of said legs;
            (B) an arm peg positioned on each of a first arm and a second arm, each of said arms perpendicularly abutting said crosspiece of said crossbar, and said arm pegs extending outwardly from said arms; and
            (C) a hooking ring member encircling each of said legs and removably engaging one of said plurality of leg pegs on each of said legs, said hooking ring member also removably engaging said arm peg on each of said arms of said crossbar; and
        (iv) means for removably fastening said deck to a top surface of each of said crossbars; and
    (c) means for stabilizing said storage device within said container.

2. The storage device of claim 1, wherein said surface of said deck includes at least one row of substantially parallel rungs for guiding said vehicle onto said deck, said row of rungs including a front end and rear end corresponding to the front end and rear end of said deck.

3. The storage device of claim 1, wherein said stabilizing means comprises at least two floor bars removably mounted to said pairs of legs so as to join one leg of each of said pairs of legs together.

4. The storage device of claim 3, wherein said stabilizing means further comprises a wall brace for securing said storage device to said walls of said container, said wall brace mounted on said first end and second end of said crossbar and extending horizontally outwardly to firmly engage said walls of said container.

5. The storage device of claim 1, further comprising means for adjusting a width of said deck so as to enable vehicles of varying widths to be stored on said deck, said width adjusting means comprising at least one slideable collar element mounted to each of said crossbars of said deck.

6. An adjustable storage device for loading and transporting vehicles in a substantially rectangular container having a roof, a floor, and four walls, comprising:
    (a) a deck for supporting a vehicle in an elevated position, said deck comprising a substantially rectangular planar support capable of securely supporting a vehicle at various angled elevations relative to said floor of said container, said deck having a front end and a rear end and including at least one row of substantially parallel rungs for guiding said vehicle onto said deck, said row of rungs including a front end and rear end corresponding to the front end and rear end of said deck;
    (b) means for adjustably securing said deck in an elevated position, comprising:
        (i) at least two pairs of substantially vertical legs, one pair positioned substantially adjacent said front end of said deck and one pair positioned substantially adjacent said rear end of said deck;
        (ii) at least two substantially horizontal crossbars, a crosspiece of said crossbars bridging said pairs of legs;
        (iii) means for adjustably securing each of said crossbars to each of said pairs of legs in said bridging relationship, comprising:
            (A) a plurality of leg pegs positioned along the length of each of said legs and extending outwardly from each of said legs;
            (B) an arm peg positioned on each of a first arm and a second arm, each of said arms perpendicularly abutting said crosspiece of said crossbar, and said arm pegs extending outwardly from said arms; and
            (C) a hooking ring member attached to each of said legs and removably engaging one of said plurality of leg pegs on each of said legs, said hooking ring member also removably engaging said arm peg on said arms of said crossbar; and
        (iv) means for removably fastening said deck to a top surface of each of said crossbars;
    (c) means for stabilizing said storage device within said container, comprising at least two floor bars removably mounted to said pairs of legs so as to join one leg of each of said pairs of legs together, and further comprising a wall brace for securing said storage device to said walls of said container, said wall brace mounted on said first end and second end of said crossbar and extending horizontally outwardly to firmly engage said walls of said container; and
    (d) means for adjusting the width of said deck so as to enable vehicles of varying widths to be stored on said deck, said width adjusting means comprising at least one slideable collar element mounted to each of said crossbars of said deck.

* * * * *